United States Patent
Zhou et al.

(10) Patent No.: US 9,733,078 B2
(45) Date of Patent: Aug. 15, 2017

(54) LEVELNESS DETECTING DEVICE AND METHOD, LEVELNESS ADJUSTING DEVICE AND METHOD

(71) Applicants: Boe Technology Group Co., Ltd., Beijing (CN); Hefei Xinsheng Optoelectronics Technology Co., Ltd., Anhui (CN)

(72) Inventors: Xiang Zhou, Beijing (CN); Dong Guo, Beijing (CN); Zhixia Liao, Beijing (CN); Dong Han, Beijing (CN)

(73) Assignees: BOE TECHNOLOGY GROUP CO., LTD., Beijing (CN); HEFEI XINSHENG OPTOELECTRONICS TECHNOLOGY CO., LTD, Anhui (CN)

( * ) Notice: Subject to any disclaimer, the term of this patent is extended or adjusted under 35 U.S.C. 154(b) by 31 days.

(21) Appl. No.: 15/022,270

(22) PCT Filed: Sep. 10, 2015

(86) PCT No.: PCT/CN2015/089300
§ 371 (c)(1),
(2) Date: Mar. 16, 2016

(87) PCT Pub. No.: WO2016/176940
PCT Pub. Date: Nov. 10, 2016

(65) Prior Publication Data
US 2017/0160085 A1 Jun. 8, 2017

(30) Foreign Application Priority Data
May 4, 2015 (CN) .......................... 2015 1 0222073

(51) Int. Cl.
*G01C 9/06* (2006.01)

(52) U.S. Cl.
CPC ......... *G01C 9/06* (2013.01); *G01C 2009/066* (2013.01)

(58) Field of Classification Search
CPC ..... G01C 15/00; G01C 2009/066; G01C 9/06
(Continued)

(56) References Cited

U.S. PATENT DOCUMENTS 5,740,693 A 4/1998 Tanaka
6,137,635 A * 10/2000 Nakazawa ......... G02B 27/0068
348/E9.027
(Continued)

FOREIGN PATENT DOCUMENTS

CN 2578789 10/2003
CN 2935087 8/2007
(Continued)

OTHER PUBLICATIONS

International Search Report and Written Opinion from PCT/CN15/089300 dated Jan. 13, 2016.
(Continued)

*Primary Examiner* — Yaritza Guadalupe-McCall
(74) *Attorney, Agent, or Firm* — Calfee, Halter & Griswold LLP

(57) ABSTRACT

The present disclosure discloses a levelness detecting device and method, and a levelness adjusting device and method. The levelness detecting device comprises a light emitter, a semi-reflecting, semi-transmitting mirror, and a plurality of reflecting mirrors comprising a first reflecting mirror, a second reflecting mirror and a third reflecting mirror. The semi-reflecting, semi-transmitting mirror and the plurality of reflecting mirrors are arranged on a to-be-detected plane and are each provided with a scale indicative of a height.

20 Claims, 14 Drawing Sheets

(58) Field of Classification Search
USPC .................................................. 33/290, 228
See application file for complete search history.

(56) References Cited

U.S. PATENT DOCUMENTS

| | | | | |
|---|---|---|---|---|
| 9,243,898 B2* | 1/2016 | Masa | ..................... | G01B 11/14 |
| 2010/0064534 A1* | 3/2010 | Schumacher | ........ | G01C 15/004 |
| | | | | 33/228 |
| 2016/0131479 A1* | 5/2016 | Kumagai | ............... | G01C 15/06 |
| | | | | 33/290 |
| 2017/0160085 A1* | 6/2017 | Zhou | ........................ | G01C 9/06 |

FOREIGN PATENT DOCUMENTS

| | | |
|---|---|---|
| CN | 101666644 | 3/2010 |
| CN | 201993111 | 9/2011 |
| CN | 103884316 | 6/2014 |
| CN | 103954267 | 7/2014 |
| CN | 104776838 | 7/2015 |
| JP | 2010197333 | 9/2010 |

OTHER PUBLICATIONS

Office action from Chinese Application No. 201510222073.X dated Aug. 18, 2016.

* cited by examiner

LEVELNESS DETECTING DEVICE AND METHOD, LEVELNESS ADJUSTING DEVICE AND METHOD

RELATED APPLICATIONS

The present application is the U.S. national phase entry of PCT/CN2015/089300, with an international filing date of Sep. 10, 2015, which claims the benefit of Chinese Patent Application No. 201510222073.X, filed on May 4, 2015, the entire disclosures of which are incorporated herein by reference.

TECHNICAL FIELD

The present disclosure relates to the field of measurement and control technologies, and particularly to a levelness detecting device and method, and a levelness adjusting device and method.

BACKGROUND

A robot is a machine or device capable of operating automatically, which may operate either according to a person's instruction or according to a pre-programmed program. The robot can operate in place of a person and can operate with a high work efficiency and stable work quality. Hence, robotics is extensively applied to fields such as production, architecture and manufacture. For example, during manufacture of a liquid crystal panel, a robot may perform work such as transportation of substrates in place of people.

The robot usually comprises a base and arms secured to the base. The robot usually accomplishes transportation of an article by virtue of the arms, which are usually in a horizontal state. Over time, the robot's arms inevitably sag so that the robot cannot operate as effectively. Slight sag usually cannot be directly observed via naked eyes. Therefore, a levelness detecting device needs to be used to detect the levelness of the arms. In the prior art, usually a levelness measuring instrument is employed to detect the levelness of the robot's arms. The robot usually comprises a first arm and a second arm, the upper surfaces of which are usually coplanar and parallel to a horizontal plane. Specifically, the levelness measuring instrument is placed at a position at a preset distance from the robot, and the position of the levelness measuring instrument is kept the same during the detection. First, a ruler is placed at a front end of the first arm in a way that a surface of the ruler where the scale lies faces towards the levelness measuring instrument and a lengthwise direction of the ruler is perpendicular to an upper surface of the first arm, and a reading indicated by the ruler at this time is observed via the levelness measuring instrument, which reading is recorded as a first reading. Then, the ruler is moved to a rear end of the first arm, and a reading indicated by the ruler at this time is observed via the levelness measuring instrument, which reading is recorded as a second reading. Next, the ruler is moved to a front end of the second arm, and a reading indicated by the ruler at this time is observed via the levelness measuring instrument, which reading is recorded as a third reading. Then, the ruler is moved to a rear end of the second arm, and a reading indicated by the ruler at this time is observed via the levelness measuring instrument, which reading is recorded as a fourth reading. The front end of each of the first arm and second arm is the end of the arm away from the base, and the rear end of each arm is the end of the arm close to the base. Whether the robot's arms are in a horizontal state is determined from whether the first indication, the second indication, the third indication and the fourth indication are equal.

There are at least the following problems with the prior art: in detection of the levelness of the robot's arms by the levelness measuring instrument, a ruler has to be used, and moved on the robot's arms, such that operations are complicated and manual measuring errors might be incurred.

SUMMARY

To solve the above problems in the prior art, embodiments of the present disclosure provide a levelness detecting device and method and a levelness adjusting device and method. The technical solutions are as follows.

According to a first aspect of the present disclosure, a levelness detecting device is provided, comprising: a light emitter; a semi-reflecting, semi-transmitting mirror; and a plurality of reflecting mirrors comprising a first reflecting mirror, a second reflecting mirror and a third reflecting mirror; wherein the semi-reflecting, semi-transmitting mirror and the plurality of reflecting mirrors are arranged on a to-be-detected plane and are each provided with a scale indicative of a height; and wherein light emitted from the light emitter is split into two beams of exit light after passing through the semi-reflecting, semi-transmitting mirror, with one beam of exit light reaching the first reflecting mirror and the other reaching the second reflecting mirror and then reflected by the second reflecting mirror to the third reflecting mirror, and the levelness of the to-be-detected plane is detected by comparing scale readings of the light on the semi-reflecting, semi-transmitting mirror and the plurality of reflecting mirrors.

Optionally, the light emitter emits light in a horizontal direction.

Optionally, the semi-reflecting, semi-transmitting mirror, the first reflecting mirror, the second reflecting mirror and the third reflecting mirror are arranged such that the to-be-detected plane is detected as a horizontal plane if the scale readings on the semi-reflecting, semi-transmitting mirror, the first reflecting mirror, the second reflecting mirror and third reflecting mirror are equal to one another, and otherwise the to-be-detected plane is detected as being in a non-horizontal state.

Optionally, the semi-reflecting, semi-transmitting mirror is provided with a semi-reflecting, semi-transmitting film on a light entry surface thereof, the semi-reflecting, semi-transmitting film is provided with a scale in a height direction of the semi-reflecting, semi-transmitting mirror, each of the plurality of reflecting mirrors is provided with a total reflecting film on a light entry surface thereof, and the total reflecting film is provided with a scale in a height direction of the reflecting mirror.

Optionally, a distance between the semi-reflecting, semi-transmitting mirror and the first reflecting mirror is equal to a distance between the second reflecting mirror and the third reflecting mirror, and a distance between the semi-reflecting, semi-transmitting mirror and the second reflecting mirror is equal to a distance between the first reflecting mirror and the third reflecting mirror.

Optionally, the light entry surface of the semi-reflecting, semi-transmitting mirror and the light entry surface of each of the plurality of reflecting mirrors are both flat surfaces, the light entry surface of the semi-reflecting, semi-transmitting mirror is parallel to the light entry surface of the second reflecting mirror, and the light entry surface of the first reflecting mirror is parallel to the light entry surface of the third reflecting mirror.

Optionally, an angle between the light entry surface of the semi-reflecting, semi-transmitting mirror and the light entry surface of the first reflecting mirror is 90 degrees, and an angle between the light entry surface of the second reflecting mirror and the light entry surface of the third reflecting mirror is 90 degrees.

Optionally, the light emitter is a laser emitter.

Optionally, the scale of each of the semi-reflecting, semi-transmitting mirror and the plurality of reflecting mirrors has a precision of 0.01 mm.

According to a second aspect of the present disclosure, a levelness adjusting device is provided for use with the levelness detecting device as recited in the first aspect, comprising: a supporting member configured to support a to-be-adjusted device and provided with an adjusting hole; and an adjusting unit running through the adjusting hole disposed on the supporting member and contacting with the to-be-adjusted device; wherein the adjusting unit moves relative to the adjusting hole to adjust the levelness of the to-be-adjusted device.

Optionally, the adjusting unit is movable in a direction in which it runs through the adjusting hole.

Optionally, the adjusting unit comprises an adjusting knob threadedly engaged with the adjusting hole.

Optionally, the adjusting knob is any one of a screw and a nut.

Optionally, the number of the adjusting knobs is n, wherein n is a positive integer; said n adjusting knobs are distributed on the supporting member according to a preset rule.

According to a third aspect of the present disclosure, there is provided a levelness detecting method of using the levelness detecting device according to the first aspect to detect a levelness of a to-be-detected device, comprising: reading scale readings on the semi-reflecting, semi-transmitting mirror and the plurality of reflecting mirrors; judging whether the scale readings on the semi-reflecting, semi-transmitting mirror and the plurality of reflecting mirrors are equal; and determining that the to-be-detected device is in a horizontal state if the scale readings on the semi-reflecting, semi-transmitting mirror and the plurality of reflecting mirrors are all equal; determining that the to-be-detected device is in a non-horizontal state if the scale readings on the semi-reflecting, semi-transmitting mirror and the plurality of reflecting mirrors are unequal.

According to a fourth aspect of the present disclosure, there is provided a levelness adjusting method of using the levelness adjusting device according to the second aspect to adjust a levelness of a to-be-detected device, comprising: detecting the levelness of the to-be-detected device using the levelness detecting method according to the third aspect; selecting any one of the scale readings on the semi-reflecting, semi-transmitting mirror and the plurality of reflecting mirrors as a reference reading if the to-be-detected device is in a non-horizontal state, and adjusting the adjusting unit in the levelness adjusting device such that the scale readings other than the reference reading are equal to the reference reading.

The present disclosure has the following advantageous effects: detection of the levelness based on the scale readings on the semi-reflecting, semi-transmitting mirror and the plurality of reflecting mirrors solves the problem that when the level measuring instrument is used to detect the levelness, complicated operations are required and manual measuring errors are apt to be incurred, and achieves an effect of a simplified operation procedure and an improved measurement precision.

It should be appreciated that the above depiction and the following detailed description are only for exemplary and illustrative purpose and not intended to limit the present disclosure.

BRIEF DESCRIPTION OF THE DRAWINGS

To make technical solutions in embodiments of the present disclosure more apparent, drawings used in description of the embodiments will be introduced in brief. Obviously, the drawings in the following description are only some embodiments of the present disclosure, and those of ordinary skill in the art may obtain other drawings based thereon without making any inventive efforts.

DETAILED DESCRIPTION

To make embodiments, technical solutions, and advantages of the present disclosure more apparent, embodiments of the present disclosure will be described in detail with reference to the drawings.

Figure 1:
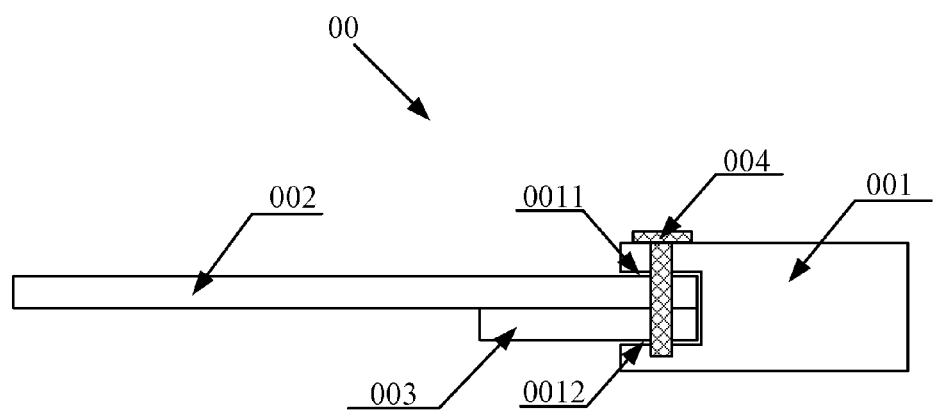
FIG. 1 is a side view of a robot provided in the prior art.

Referring to FIG. 1, it shows a side view of a robot 00 in the prior art. As shown in FIG. 1, the robot 00 comprises a base 001, an arm 002 and an arm supporting member 003 for supporting the arm 002. The arm 002 may usually comprise a first arm and a second arm. The base 001 is provided with a first mounting slot 0011 for mounting the arm 002 and a second mounting slot 0012 for mounting the arm supporting member 003, and the first mounting slot 0011 is communicated with the second mounting slot 0012. The arm 002 and arm supporting member 003 are disposed in the first mounting slot 0011 and second mounting slot 0012, respectively and fixed to the base 001 via a screw 004 that runs through the base 001, the arm 002 and the arm supporting member 003 in sequence.

Figure 2:
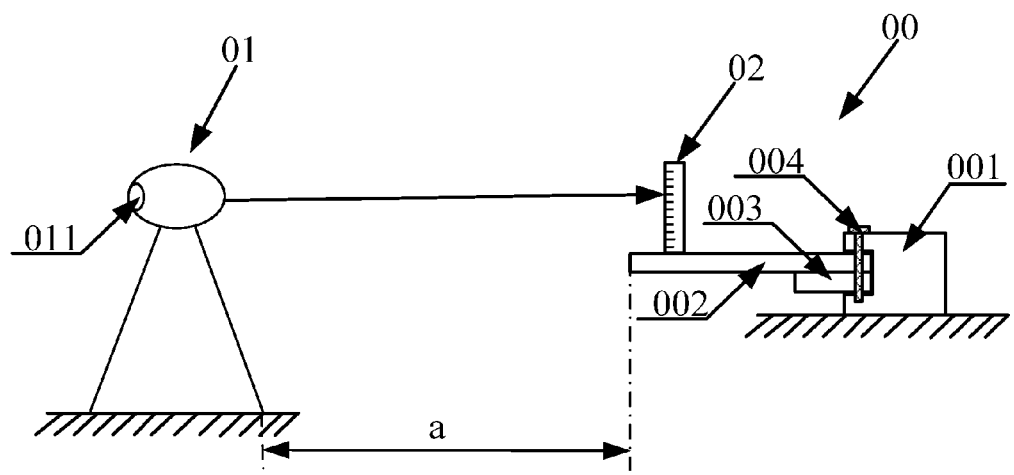
FIG. 2 is a scenario view illustrating detection of a levelness of an arm of a robot according to the prior art.

Referring to FIG. 2, it shows a scenario view illustrating detection of a levelness of the arm 002 of the robot 00 shown in FIG. 1 and adjustment of the levelness. As shown in FIG. 2, a levelness measuring instrument 01 is disposed at a preset distance a away from the robot 00, the levelness measuring instrument 01 is provided with a human eye observation position 011, and a ruler 02 is placed on the arm 002 (which may be the first arm or second arm). In the prior art, when sag of the arm 002 is detected and thus the levelness needs to adjusted, the screw 004 usually needs to be screwed off such that the arm 002 is detached from the base 001, and a pad (not shown in FIG. 2) is placed on an end of the arm supporting member 003 that is away from the base 001. Then the arm 002 is mounted on the base 001, and the levelness of the arm 002 is detected again. If the am 002 is still in a saggy state, the arm 002 is detached from the base 001 again, and the pad is replaced with another one with a larger thickness. This procedure is repeated until the arm 002 is in a horizontal state. Hence, the procedure for adjusting the levelness of the arm in the prior art is complicated, time-consuming and low in adjustment precision.

Figure 3:
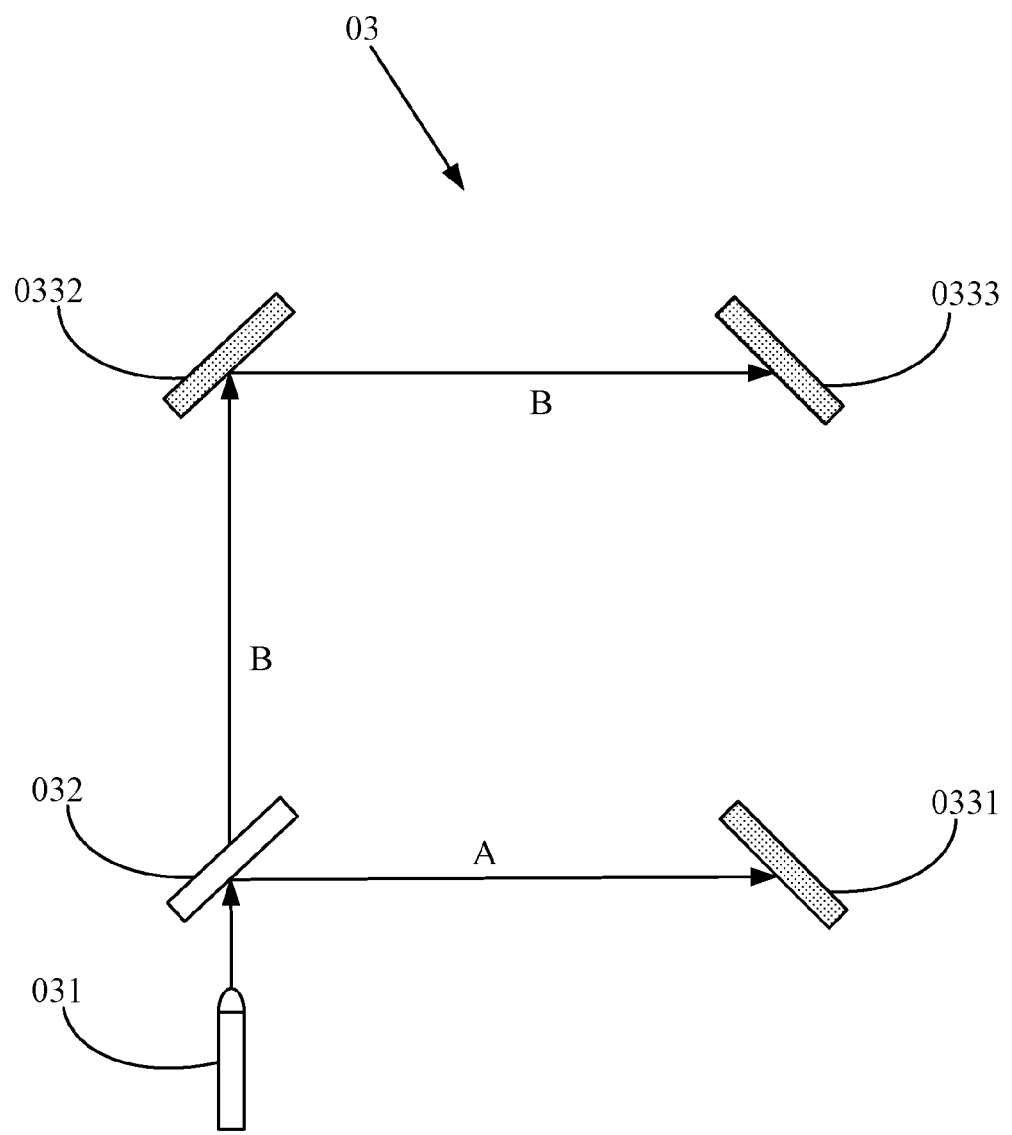
FIG. 3 is a schematic view of a levelness detecting device according to an embodiment of the present disclosure.

Referring to FIG. 3, it shows a schematic view of a levelness detecting device 03 according to an embodiment of the present disclosure. As shown in FIG. 3, the levelness detecting device 03 comprises a light emitter 031, a semi-reflecting, semi-transmitting mirror 032 and a plurality of reflecting mirrors. To facilitate observation by human eyes, the light emitter 031 may be a laser emitter. The semi-reflecting, semi-transmitting mirror and the plurality of reflecting mirrors are disposed on a plane to be detected. The levelness refers to a parallel degree of the plane to be detected with respect to a sea level (a horizontal plane).

The semi-reflecting, semi-transmitting mirror 032 and the plurality of reflecting mirrors are each provided with a scale. The plurality of reflecting mirrors comprises a first reflecting mirror 0331, a second reflecting mirror 0332 and a third reflecting mirror 0333.

Light emitted from the light emitter 031 passes through the semi-reflecting, semi-transmitting mirror 032 and is split into two beams of exit light. These two beams of exit light may be exit light A and exit light B, respectively, as shown in FIG. 3. The beam of exit light A reaches the first reflecting mirror 0331, the other beam of exit light B reaches the second reflecting mirror 0332 which then reflects it to the third reflecting mirror 0333. The levelness is detected by comparing scale readings on the semi-reflecting, semi-transmitting mirror 032 and the plurality of reflecting mirrors. For example, the light emitter 031, the semi-reflecting, semi-transmitting mirror 032, the first reflecting mirror 0331, the second reflecting mirror 0332 and the third reflecting mirror 0333 may be arranged such that the light emitter 031 emits light in a horizontal direction, and the plane to be detected is detected as a horizontal plane if the scale readings on the semi-reflecting, semi-transmitting mirror 032, the first reflecting mirror 0331, the second reflecting mirror 0332 and third reflecting mirror 0333 are equal to one another, and otherwise the plane to be detected is detected as being in a non-horizontal state.

Figure 4:
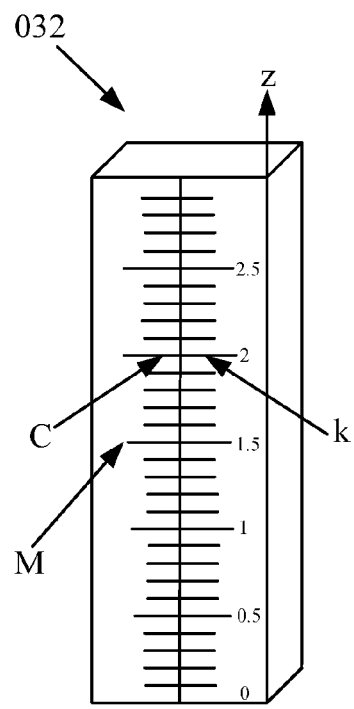
FIG. 4 is a structural schematic view of a semi-reflecting, semi-transmitting mirror provided by the embodiment shown in FIG. 3.

FIG. 4 shows a structural schematic view of the semi-reflecting, semi-transmitting mirror provided by the embodiment shown in FIG. 3. A light entry surface of the semi-reflecting, semi-transmitting mirror 032 may be a flat surface on the semi-reflecting, semi-transmitting mirror 032, through which light enters the semi-reflecting, semi-transmitting mirror 032. As shown in FIG. 4, the semi-reflecting, semi-transmitting mirror 032 may be of a cuboidal structure, and a light entry surface M of the semi-reflecting, semi-transmitting mirror 032 is provided with a semi-reflecting, semi-transmitting film (not shown in FIG. 4). By way of example, the semi-reflecting, semi-transmitting film may be formed by plating a layer of semi-reflecting, semi-transmitting material on the light entry surface M of the semi-reflecting, semi-transmitting mirror 032. The semi-reflecting, semi-transmitting film is provided with a scale in a height direction z of the semi-reflecting, semi-transmitting mirror 032, and a precision of the scale may be 0.01 millimeter (mm). The scale reading of the semi-reflecting, semi-transmitting mirror 032 is a scale indicated by the light when it impinges on the semi-reflecting, semi-transmitting mirror 032, for example, scale k indicated by light C as shown in FIG. 4. In the example shown in FIG. 4, the scale indicated by light C is 2. It is to be noted that the scale in FIG. 4 is only illustrative and not intended to limit the present disclosure.

Figure 5:
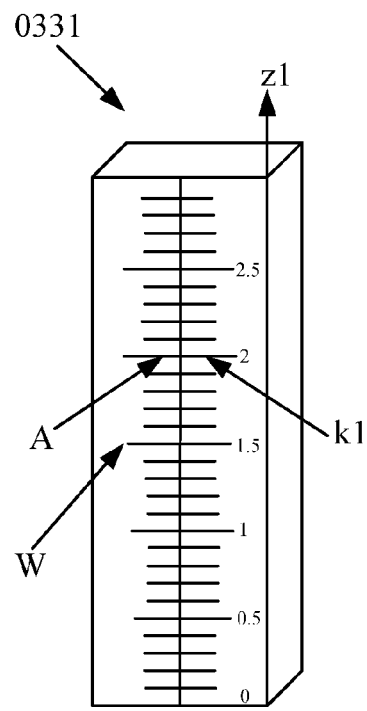
FIG. 5 is a structural schematic view of a first reflecting mirror provided by the embodiment shown in FIG. 3.

In some embodiments, the light entry surfaces of the plurality of reflecting mirrors are flat surfaces, and the light entry surface of each reflecting mirror is a surface on the reflecting mirror through which light enters the reflecting mirror. The light entry surface of each reflecting mirror is provided with a total reflecting film, which film is provided with a scale in a height direction of the reflecting mirror. The precision of the scale may be 0.01 mm. Referring to FIG. 5, it shows a structural schematic view of a first reflecting mirror 0331 provided by the embodiment shown in FIG. 3. As shown in FIG. 5, in the example illustrated, the first reflecting mirror 0331 may be of a cuboidal structure, and a light entry surface W of the first reflecting mirror 0331 is provided with a total reflecting film (not shown in FIG. 5). By way of example, the total reflecting film may be formed by plating a layer of total reflecting film material on the light entry surface W of the first reflecting mirror 0331. The total reflecting film is provided with a scale in a height direction z1 of the first reflecting mirror 0331. The precision of the scale may be 0.01 millimeter (mm). The scale reading of the first reflecting mirror 033 is a scale indicated by the light when it impinges on the first reflecting mirror 0331, for example, scale k1 indicated by light A as shown in FIG. 5. In the example shown in FIG. 5, the scale indicated by light A is 2. It is to be noted that the scale in FIG. 5 is only illustrative and not intended to limit the present disclosure.

Figure 6:
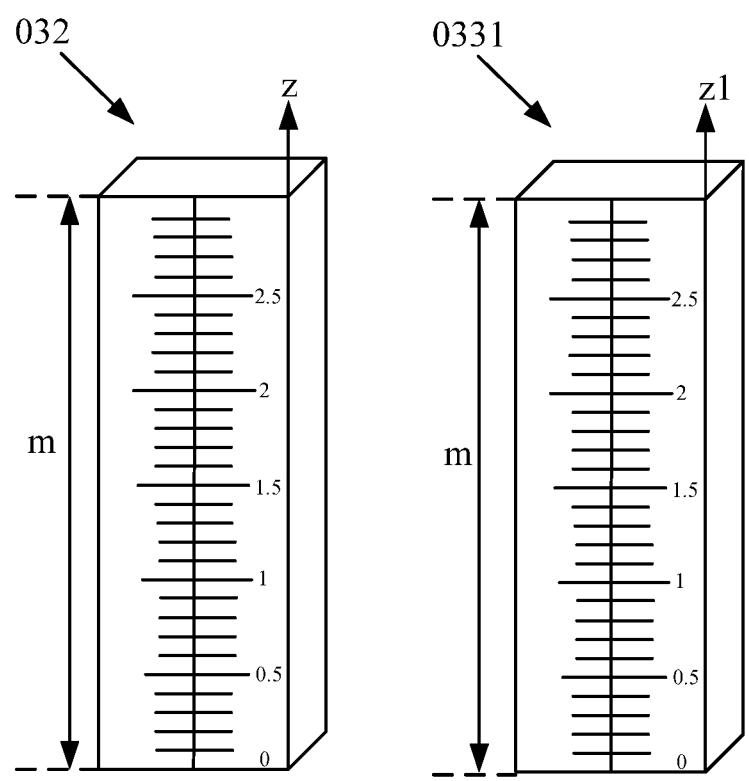
FIG. 6 is a contrast view of the semi-reflecting, semi-transmitting mirror and the first reflecting mirror provided by the embodiment shown in FIG. 3.

In the embodiment of the present disclosure, each of the scales of the semi-reflecting, semi-transmitting mirror 032 and the plurality of reflecting mirrors are a scale indicative of height with a precision of 0.01 mm. Hence, the scales of the semi-reflecting, semi-transmitting mirror 032 and the plurality of reflecting mirrors are of the same type, and the scales of the semi-reflecting, semi-transmitting mirror 032 and the plurality of reflecting mirrors are of the same range. Specifically, referring to FIG. 6, the semi-reflecting, semi-transmitting mirror 032 and the first reflecting mirror 0331 are taken as an example for a contrast purpose. As shown in FIG. 6, the scales of the semi-reflecting, semi-transmitting mirror 032 and the first reflecting mirror 0331 each has a range of m with a precision of 0.01 mm, and a distance between two adjacent scale lines on the scale of each of the semi-reflecting, semi-transmitting mirror 032 and the first reflecting mirror 0331 is 0.1 mm. Upon actual reading, an approximate read of may be performed for the precision. In the example as shown in FIG. 6, the scale point 0 of the semi-reflecting, semi-transmitting mirror 032 is located in the same plane as the bottom surface of the semi-reflecting, semi-transmitting mirror 032, and the scale point 0 of the first reflecting mirror 0331 is located in the same plane as the bottom surface of the first reflecting mirror 0331.

Figure 7:
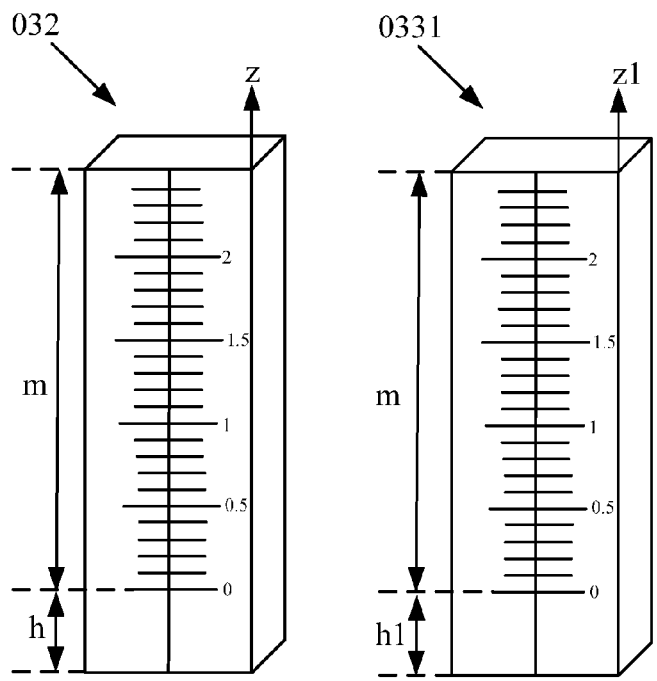
FIG. 7 is a contrast view of another semi-reflecting, semi-transmitting mirror and the first reflecting mirror provided by the embodiment shown in FIG. 3.

Indeed, the scale point 0 of the semi-reflecting, semi-transmitting mirror 032 may be higher than the bottom surface of the semi-reflecting, semi-transmitting mirror 032. Specifically, referring to FIG. 7, the semi-reflecting, semi-transmitting mirror 032 and the first reflecting mirror 0331 are taken as an example for a contrast purpose. As shown in FIG. 7, the scales of the semi-reflecting, semi-transmitting mirror 032 and the first reflecting mirror 0331 each has a range of m with a precision of 0.01 mm, and a distance between two adjacent scale lines on the scales of each of the semi-reflecting, semi-transmitting mirror 032 and the first reflecting mirror 0331 is 0.1 mm. Upon actual reading, an approximate read of may be performed for the precision. In the example as shown in FIG. 7, the scale point 0 of the semi-reflecting, semi-transmitting mirror 032 is higher than the bottom surface of the semi-reflecting, semi-transmitting mirror 032 and is a distance h apart from the bottom surface of the semi-reflecting, semi-transmitting mirror 032. At this time, the scale point 0 of the first reflecting mirror 0331 is also higher than the bottom surface of the first reflecting mirror 0331, and the distance between the scale point 0 of the first reflecting mirror 0331 and the bottom surface of the first reflecting mirror 0331 is equal to the distance h between the scale point 0 of the scale of the semi-reflecting, semi-transmitting mirror 032 and the bottom surface of the semi-reflecting, semi-transmitting mirror 032.

Figure 8:
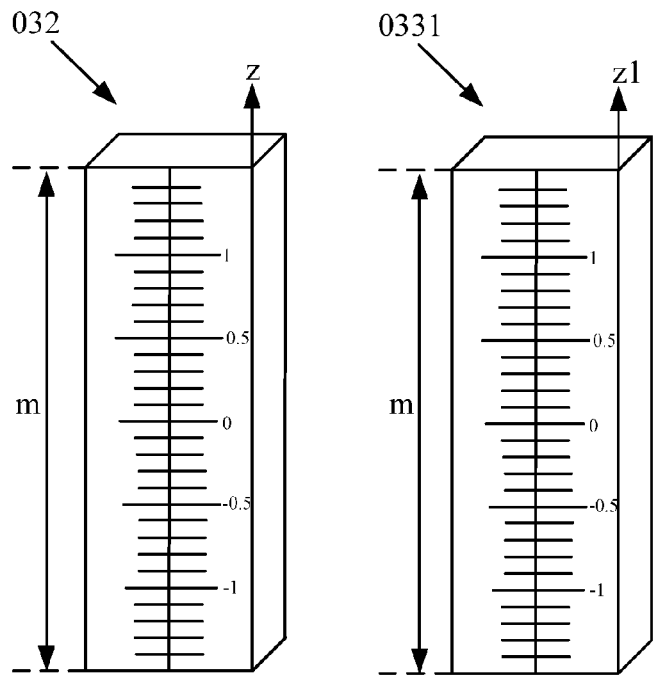
FIG. 8 is a contrast view of a further semi-reflecting, semi-transmitting mirror and the first reflecting mirror provided by the embodiment shown in FIG. 3.

In an embodiment of the present disclosure, the scale point 0 of the semi-reflecting, semi-transmitting mirror 032 may also be located at a center of the semi-reflecting, semi-transmitting mirror 032, which center refers to a center of a surface which is on the semi-reflecting, semi-transmitting mirror 032 and parallel to the height direction z. Likewise, the scale point 0 of any one of the plurality of reflecting mirrors may also be located at a center of the reflecting mirror. Specifically, referring to FIG. 8, the semi-reflecting, semi-transmitting mirror 032 and the first reflecting mirror 0331 are taken as an example for a contrast purpose. As shown in FIG. 8, the scales of the semi-reflecting, semi-transmitting mirror 032 and the first reflecting mirror 0331 each has a range of m with a precision of 0.01 mm, and a distance between two adjacent scale lines on the scale of each of the semi-reflecting, semi-transmitting mirror 032 and the first reflecting mirror 0331 is 0.1 mm. Upon actual reading, an approximate read may be performed for the precision. In the example as shown in FIG. 8, the scale point 0 of the semi-reflecting, semi-transmitting mirror 032 is located at the center of the semi-reflecting, semi-transmitting mirror 032, and at the same time, the scale point 0 of the first reflecting mirror 0331 is located at the center of the first reflecting mirror 0331.

The preceding illustration takes the first reflecting mirror 0331 as an example. In some embodiments, the second reflecting mirror 0332 and/or third reflecting mirror 0333 may each be a reflecting mirror that is completely the same as the first reflecting mirror 0331. Thus, the analogous embodiments will not be detailed here for simplicity.

Figure 9:
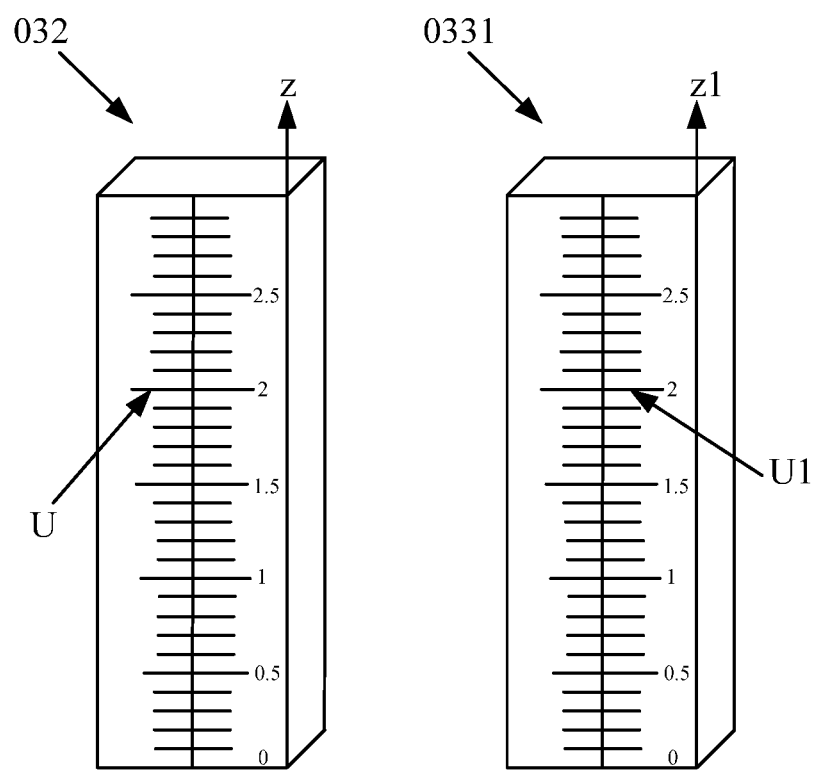
FIG. 9 is a contrast view of a further semi-reflecting, semi-transmitting mirror and the first reflecting mirror provided by the embodiment shown in FIG. 3.

In some embodiments, so long as the scale of the semi-reflecting, semi-transmitting mirror 032 indicated by the light is identical with the scale of the plurality of reflecting mirrors indicated by the light, the scale reading on the semi-reflecting, semi-transmitting mirror 032 that is indicated by the light is equal to the scale reading on the plurality of reflecting mirrors that is indicated by the light, regardless of a specific position of the scale on which the light impinges. By way of example, referring to FIG. 9, the semi-reflecting, semi-transmitting mirror 032 and the first reflecting mirror 0331 are taken as an example for a contrast purpose. As shown in FIG. 9, if the light impinges at a position U indicating scale "2" of the semi-reflecting, semi-transmitting mirror 032 and a position U1 indicating scale "2" of the first reflecting mirror 0331, respectively, the scale reading on the semi-reflecting, semi-transmitting mirror 032 that is indicated by the light is equal to the scale reading on the first reflecting mirror 0031 that is indicated by the light. If the position of the scale of the semi-reflecting, semi-transmitting mirror 032 at which the light impinges is not identical with the position of scale of the plurality of reflecting mirrors at which the light impinges, the scale reading on the semi-reflecting, semi-transmitting mirror 032 that is indicated by the light is not equal to the scale reading on the plurality of reflecting mirrors that is indicated by the light.

Figure 10:
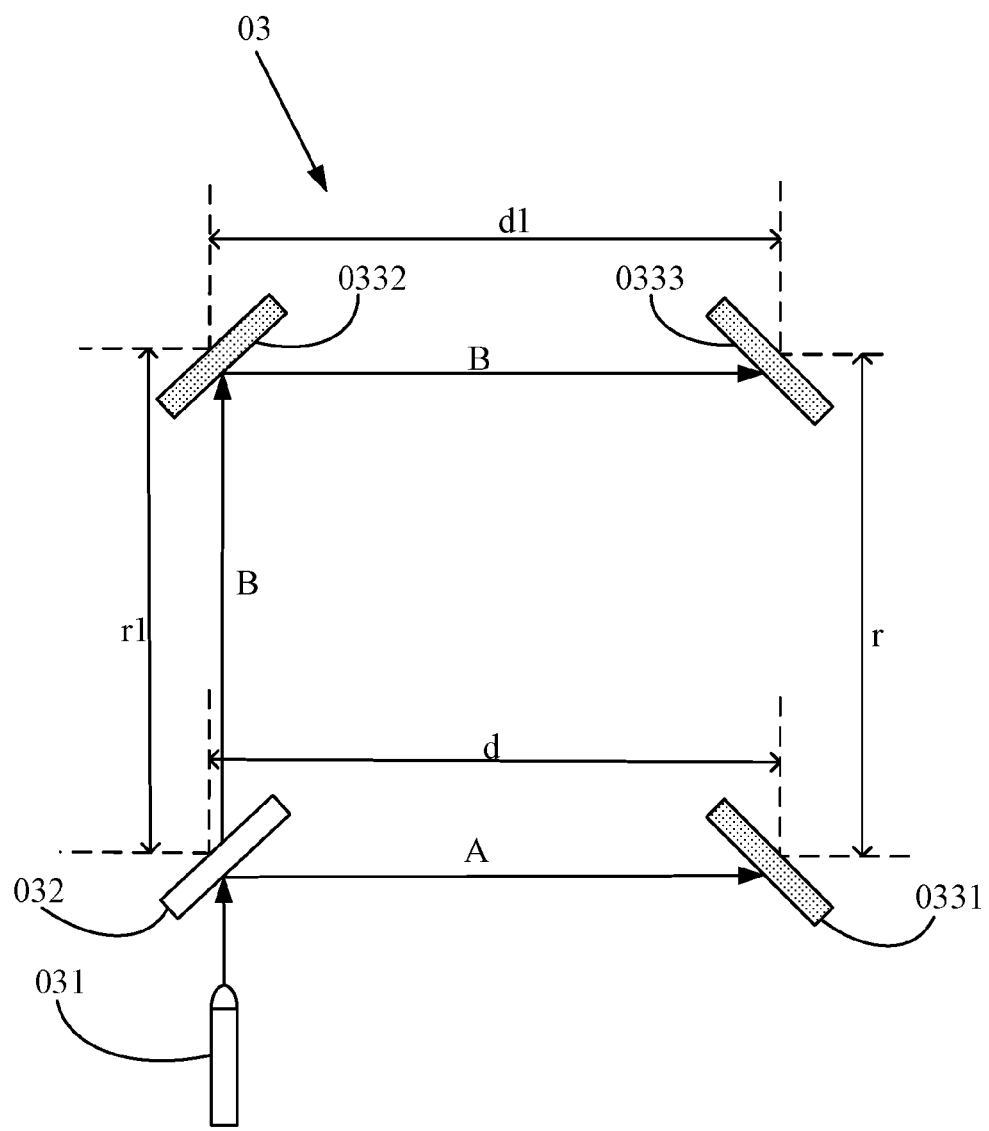
FIG. 10 is a view showing a positional relationship between the semi-reflecting, semi-transmitting mirror and a plurality of reflecting mirrors provided by the embodiment shown in FIG. 3.

Turning to FIG. 10, it shows a view illustrating a positional relationship between the semi-reflecting, semi-transmitting mirror and the plurality of reflecting mirrors provided by the embodiment shown in FIG. 3. As shown in FIG. 10, in order that the light emitted from the light emitter 031 impinges on the semi-reflecting, semi-transmitting mirror 032, that the exit light A passing through the semi-reflecting, semi-transmitting mirror 032 impinges on the first reflecting mirror 0331, and that the exit light B impinges on the second reflecting mirror 0332 and then is reflected by the second reflecting mirror 0332 to impinge on the third reflecting mirror 0333, a distance d between the semi-reflecting, semi-transmitting mirror 032 and the first reflecting mirror 0331 is equal to a distance d1 between the second reflecting mirror 0332 and the third reflecting mirror 0333, and a distance r1 between the semi-reflecting, semi-transmitting mirror 032 and the second reflecting mirror 0332 is equal to a distance r between the first reflecting mirror 0331 and the third reflecting mirror 0333.

Optionally, the light entry surface of the semi-reflecting, semi-transmitting mirror 032 is parallel to the light entry surface of the second reflecting mirror 0332, and the light entry surface of the first reflecting mirror 0331 is parallel to the light entry surface of the third reflecting mirror 0333.

In an embodiment, to facilitate observation of the scale readings on the semi-reflecting, semi-transmitting mirror 032 and the plurality of reflecting mirrors, an angle between the light entry surface of the semi-reflecting, semi-transmitting mirror 032 and the light entry surface of the first reflecting mirror 0331 is set to be 90 degrees, and an angle between the light entry surface of the second reflecting mirror 0332 and the light entry surface of the third reflecting mirror 0333 is set to be 90 degrees.

The levelness detecting device according to embodiments of the present disclosure may be adapted for detection of the levelness of any platform.

The levelness detecting device according to embodiments of the present disclosure may be adapted to detect the levelness of the arm 002 of the robot as shown in FIG. 1.

Figure 11:
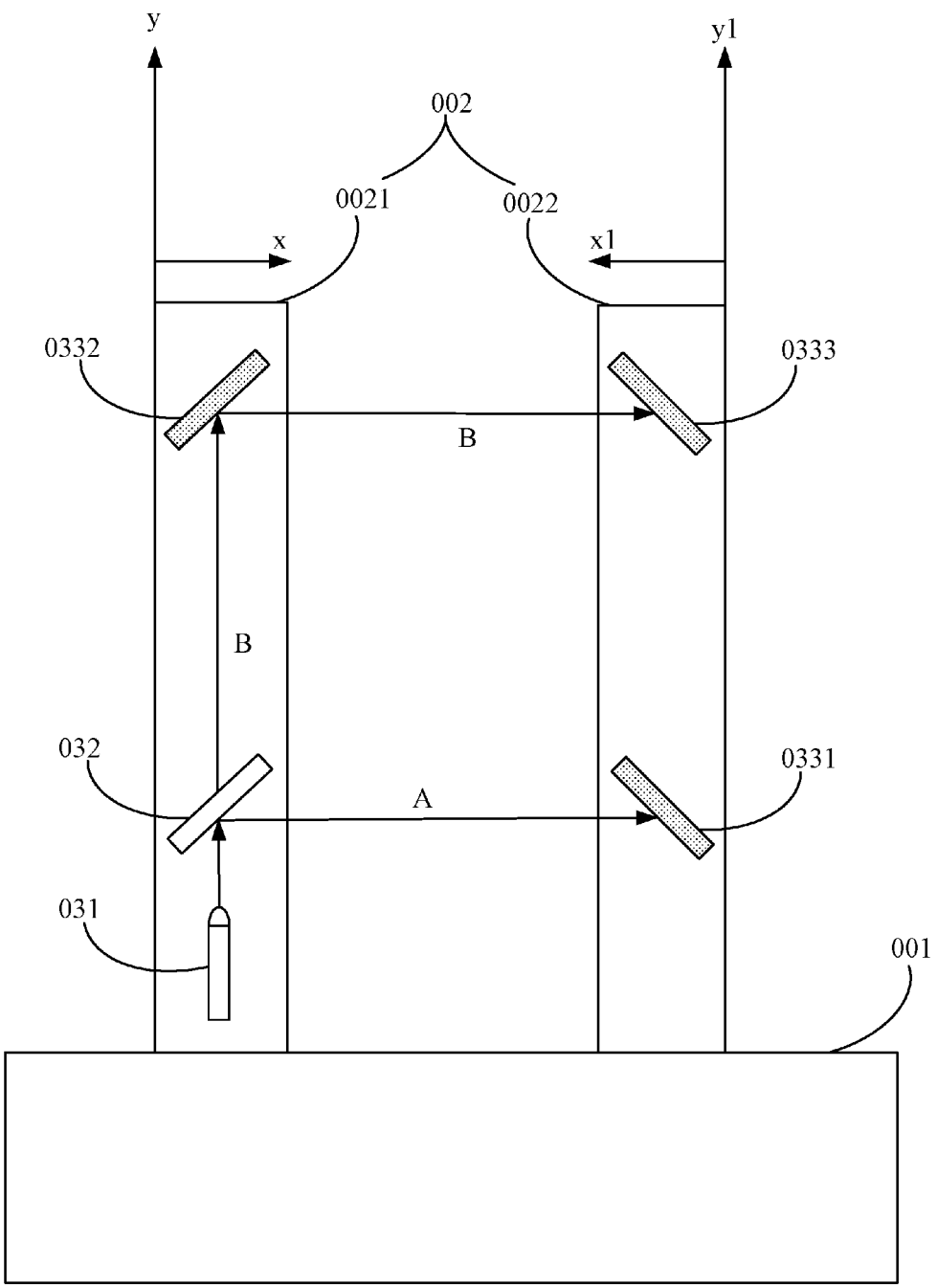
FIG. 11 is a scenario view illustrating that the levelness detecting device provided by the embodiment shown in FIG. 3 is employed to detect the levelness of the robot's arm.

Referring to FIG. 11, it shows a scenario view illustrating that the levelness detecting device according to an embodiment of the present disclosure is employed to detect the levelness of the robot's arm 002 as shown in FIG. 1, wherein the shown robot is the robot 00 shown in FIG. 1 as viewed from above. As shown in FIG. 11, the arm 002 may comprise a first arm 0021 and a second arm 0022. The arm supporting member is not shown in FIG. 11.

When the levelness detecting device 03 shown in FIG. 3 is used to detect the levelness of the arm 002, the semi-reflecting, semi-transmitting mirror 032 and the second reflecting mirror 0332 are arranged on the first arm 0021 in sequence in a length direction y of the first arm 0021, a height direction (not shown in FIG. 11) of each of the semi-reflecting, semi-transmitting mirror 032 and the second reflecting mirror 0332 is perpendicular to the top surface of the first arm 0021, and the surfaces of the semi-reflecting, semi-transmitting mirror 032 and second reflecting mirror 0332 where the scales are located both face towards the base 001. An angle between the light entry surface of the semi-reflecting, semi-transmitting mirror 032 and a width direction x of the first arm 0021 and an angle between the light entry surface of the second reflecting mirror 0332 and the width direction x of the first arm 0021 may both be 45 degrees.

The first reflecting mirror 0331 and the third reflecting mirror 0333 are arranged on the second arm 0022 in sequence in a length direction y1 of the second arm 0022, a height direction (not shown in FIG. 11) of each of the first reflecting mirror 0331 and third reflecting mirror 0333 is perpendicular to the top surface of the second arm 0022, and the surfaces of the first reflecting mirror 0331 and third reflecting mirror 0333 where the scales are located both face towards the base 001. An angle between the light entry surface of the first reflecting mirror 0331 and a width direction x1 of the second arm 0022 and an angle between the light entry surface of the third reflecting mirror 0333 and the width direction x1 of the second arm 0022 may both be 45 degrees. The distance between the second reflecting mirror 0332 and third reflecting mirror 0333 is equal to the distance between the semi-reflecting, semi-transmitting mirror 032 and the first reflecting mirror 0331, and the distance between the first reflecting mirror 0331 and the third reflecting mirror 0333 is equal to the distance between the semi-reflecting, semi-transmitting mirror 032 and the second reflecting mirror 0332.

An angle between the light entry surface of the semi-reflecting, semi-transmitting mirror 032 and the light entry surface of the first reflecting mirror 0331 is 90 degrees, and an angle between the light entry surface of the second reflecting mirror 0332 and the light entry surface of the third reflecting mirror 0333 is 90 degrees.

The light emitter 031 is disposed at an end of the first arm 0021 that is adjacent to the semi-reflecting, semi-transmitting mirror 032. The semi-reflecting, semi-transmitting mirror 032 is disposed between the light emitter 031 and the second reflecting mirror 0332, and a light-emitting end of the light emitter 031 is directed at the light entry surface of the semi-reflecting, semi-transmitting mirror 032. It is to be noted that the semi-reflecting, semi-transmitting mirror 032 may also be disposed at an end of the first arm 0021 that is away from the base 001, in which case the light emitter 031 is disposed at the end of the first arm 0021 that is adjacent to the semi-reflecting, semi-transmitting mirror 032.

By way of example, the semi-reflecting, semi-transmitting mirror 032 is disposed at a rear end of the first arm 0021, the second reflecting mirror 0332 is disposed at a front end of the first arm 0021, the first reflecting mirror 0331 is disposed at a rear end of the second arm 0022, and the third reflecting mirror 0333 is disposed at a front end of the second arm 0022. The front end of the first arm 0021 is an end of the first arm 0021 that is adjacent to the base 001, the first end of the first arm 0021 is an end of the first arm 0021 that is away from the base 001, the rear end of the second arm 0022 is an end of the second arm 0022 that is adjacent to the base 001, and the front end of the second arm 0022 is an end of the second arm 0022 that is away from the base 001.

Light emitted from the light emitter 031 passes through the semi-reflecting, semi-transmitting mirror 032 and is split into two beams of exit light. The two beams of exit light may be exit light A and exit light B, respectively, as shown in FIG. 11. The beam of exit light A reaches the first reflecting mirror 0331, and the other beam of exit light B reaches the second reflecting mirror 0332 and is then reflected by the second reflecting mirror 0332 to the third reflecting mirror 0333. The levelness of the arm 002 is detected by reading and judging whether scale readings on the semi-reflecting, semi-transmitting mirror 032 and the plurality of reflecting mirrors are equal. Specifically, the scale readings on the semi-reflecting, semi-transmitting mirror 032, the first reflecting mirror 0331, the second reflecting mirror 0332 and the third reflecting mirror 0333 are compared, and if the scale readings on the semi-reflecting, semi-transmitting mirror 032, the first reflecting mirror 0331, the second reflecting mirror 0332 and the third reflecting mirror 0333 are all equal, this indicates that the arm 002 is in a horizontal state; otherwise the arm 002 is in a non-horizontal state.

Figure 12:
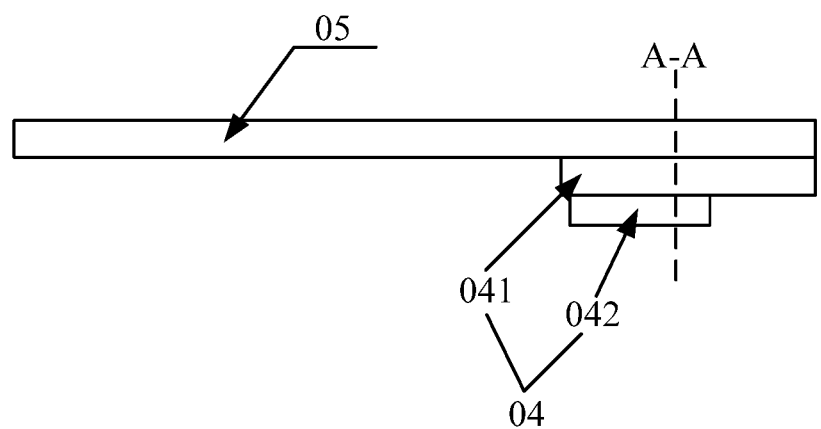
FIG. 12 is a structural schematic view of a levelness adjusting device according to an embodiment of the present disclosure.

Referring to FIG. 12, it shows a structural schematic view of a levelness adjusting device according to an embodiment of the present disclosure. The levelness adjusting device 04 may be used with the levelness detecting device as described above to adjust the levelness of a to-be-adjusted device 05. As shown in FIG. 12, the levelness adjusting device 04 comprises a supporting member 041 and an adjusting unit 042. The adjusting unit 042 runs through an adjusting hole disposed on the supporting member 041 and contacts with the to-be-adjusted device 05. The adjusting unit 042 is moved relative to the adjusting hole to adjust the levelness of the to-be-adjusted device 05. More specifically, the adjusting unit 042 is movable in a direction in which it runs through the adjusting hole.

With the adjusting unit moving relative to the adjusting hole to adjust the levelness of the to-be-adjusted device, the levelness adjusting device according to the embodiment of the present disclosure solves problems with the prior art, such as a complicated, time-consuming adjustment procedure and a low adjustment precision, and accordingly achieves an effect of a simplified, time-saving adjustment procedure and an improved adjustment precision.

Figure 13:
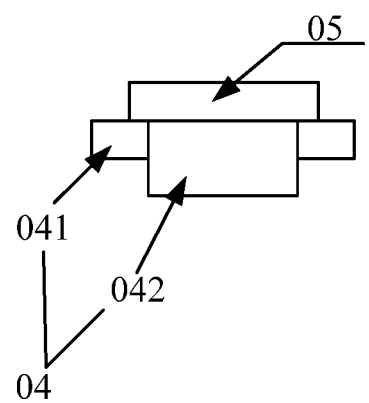
FIG. 13 is a sectional view taken along line A-A of the levelness adjusting device according to the embodiment shown in FIG. 12.

Specifically, referring to FIG. 13, it shows a sectional view taken long line A-A of the levelness adjusting device 04 shown in FIG. 12. As shown in FIG. 13, the supporting member 041 is provided with an adjusting hole (not shown in FIG. 13), and the adjusting unit 042 runs through the adjusting hole disposed on the supporting member 041 and contacts with a lower surface of the to-be-adjusted device 05. The adjusting unit 042 is moved relative to the adjusting hole to adjust the levelness of the to-be-adjusted device 05.

Figure 14:
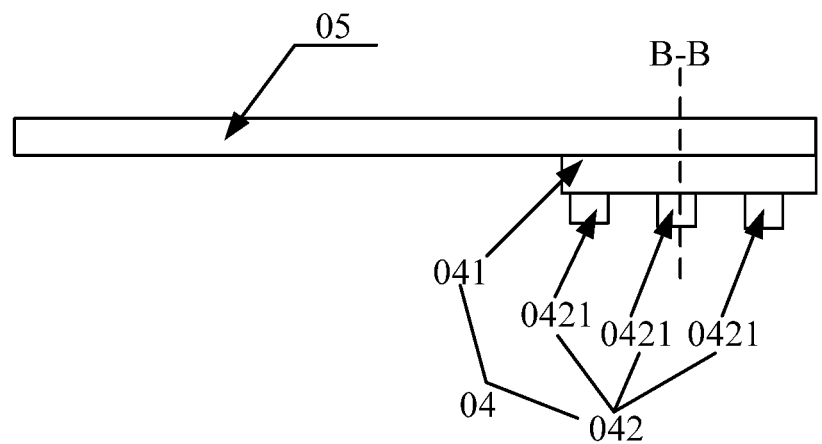
FIG. 14 is a structural schematic view of another levelness adjusting device according to an embodiment of the present disclosure.

Further referring to FIG. 14, the adjusting unit 042 comprises an adjusting knob 0421 which is threadedly engaged with the adjusting hole. Optionally, the adjusting hole is provided with internal threads, and the adjusting knob 0421 may be a screw which is threadedly engaged with the adjusting hole of the supporting member 041. Alternatively, the adjusting hole is provided with internal threads, and the adjusting knob 0421 may be a nut which is threadedly engaged with the adjusting hole of the supporting member 041.

Figure 15:
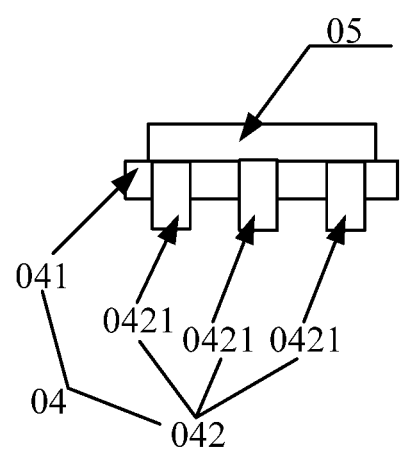
FIG. 15 is a sectional view taken long line B-B of the levelness adjusting device according to the embodiment shown in FIG. 14.

Now referring to FIG. 15, it shows a sectional view taken long line B-B of the levelness adjusting device 04 shown in FIG. 14. As shown in FIG. 15, the supporting member 041 is provided with an adjusting hole (not shown in FIG. 15), and the adjusting knob 0421 runs through the adjusting hole disposed on the supporting member 041 and contacts with a lower surface of the to-be-adjusted device 05. The adjusting knob 0421 is moved relative to the adjusting hole to adjust the levelness of the to-be-adjusted device 05.

Figure 16:
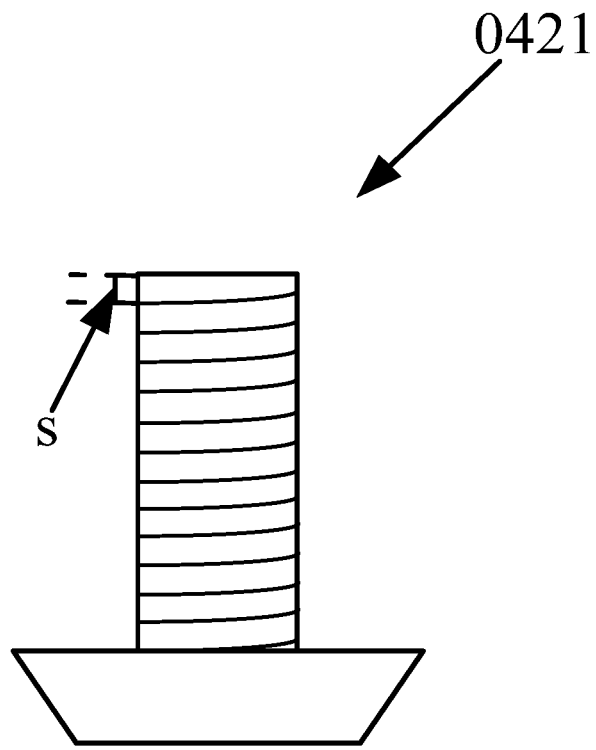
FIG. 16 is a structural schematic view of an adjusting knob according to an embodiment of the present disclosure.

Now referring to FIG. 16, it shows a structural schematic view of an adjusting knob 0421 according to an embodiment of the present disclosure. As shown in FIG. 16, to improve the adjusting precision, the adjusting knob 0421 has an equal pitch s between every two adjacent turns of the threads. When the adjusting knob 0421 is adjusted, a screwed-in distance may be determined from the number of the pitches that have been screwed in, such that whether the adjustment is proper may be determined. It is to be noted that the specific value of the pitch s of the adjusting knob 0421 may be set according to actual needs and will not be limited by embodiments of the present disclosure.

Figure 17:
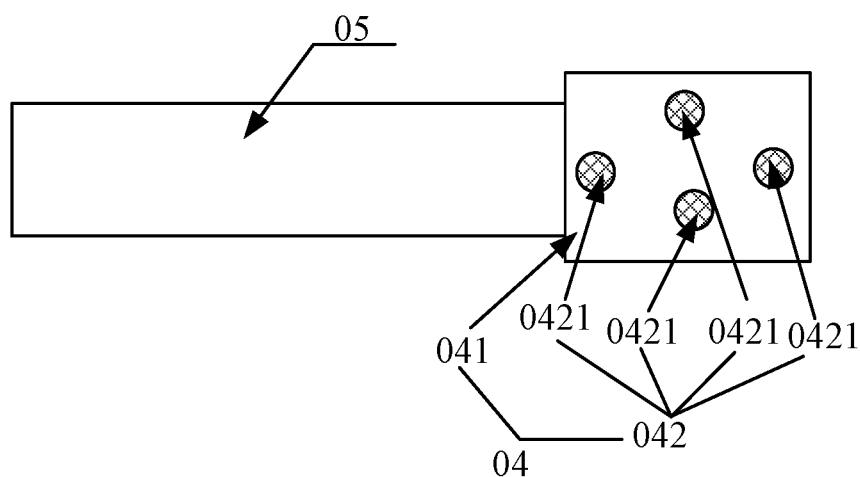
FIG. 17 is a bottom view of the levelness adjusting device according to the embodiment shown in FIG. 14.

The number of the adjusting knobs 0421 may be n, where n is a positive integer. The n adjusting knobs 0421 are distributed on the supporting member 041 according to a preset rule. By way of example, reference is made to FIG. 17 which shows a bottom view of the levelness adjusting device 04 according to the embodiment shown in FIG. 12. As shown in FIG. 17, the supporting member 041 is provided with four adjusting knobs 0421 which are arranged on the supporting member 041 in a diamond shape.

It is to be noted that the above arrangement is only for purposes of illustration. Indeed, the four adjusting knobs 0421 may be distributed on the supporting member 041 in other manners. For example, the four adjusting knobs 0421 are distributed at four corners of the supporting member 041, respectively. The number of adjusting knobs 0421 on the supporting member 041 may be of other values. For example, the supporting member 041 is provided with three adjusting knobs 0421 that are distributed on the supporting member 041 in a shape of an equilateral triangle. The embodiments of present disclosure are not so limited.

The levelness adjusting device according to the embodiments of the present disclosure may be used to adjust the levelness of the arm 002 of the robot as shown in FIG. 1.

Figure 18:
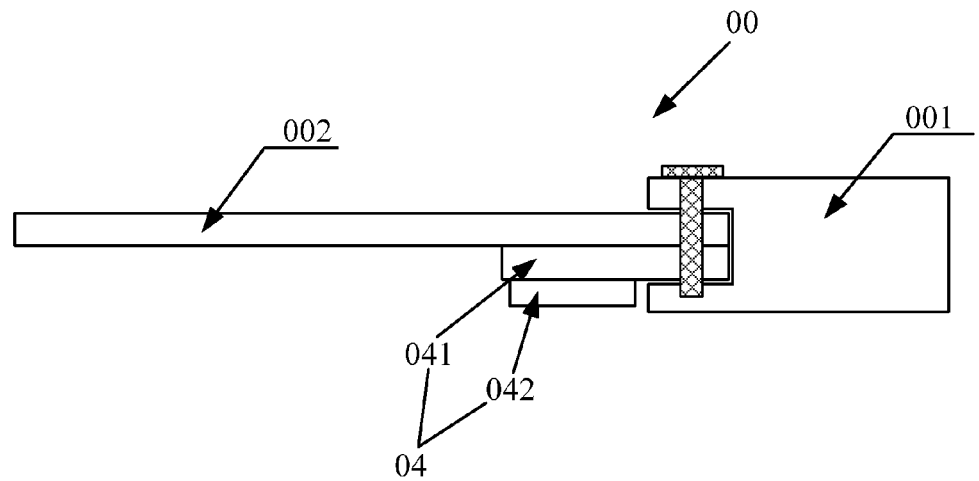
FIG. 18 is a scenario view illustrating that the levelness adjusting device according to the embodiment shown in FIG. 12 is employed to adjust the levelness of the robot's arm.

Referring to FIG. 18, it shows a scenario view illustrating that the levelness adjusting device 04 shown in FIG. 12 is employed to adjust the levelness of the arm 002 of the robot 00 shown in FIG. 1. The robot 00 comprises a base 001, an arm 002 secured to the base 001 and an arm supporting member 003 disposed below the arm 002. The arm 002 comprises a first arm and a second arm, and the arm supporting member is used to support the arm. Below the first arm and second arm is disposed the arm supporting member.

As shown in FIG. 18, the levelness adjusting device 04 comprises a supporting member 041 and an adjusting unit 042. The supporting member 041 may be the same member as the arm supporting member of the robot 00. The adjusting unit 042 runs through an adjusting hole (not shown in FIG. 18) disposed on the supporting member 041 and contacts with the arm 002 (the first arm and the second arm). The adjusting unit 042 is moved relative to the adjusting hole to adjust the levelness of the arm 002.

Figure 19:
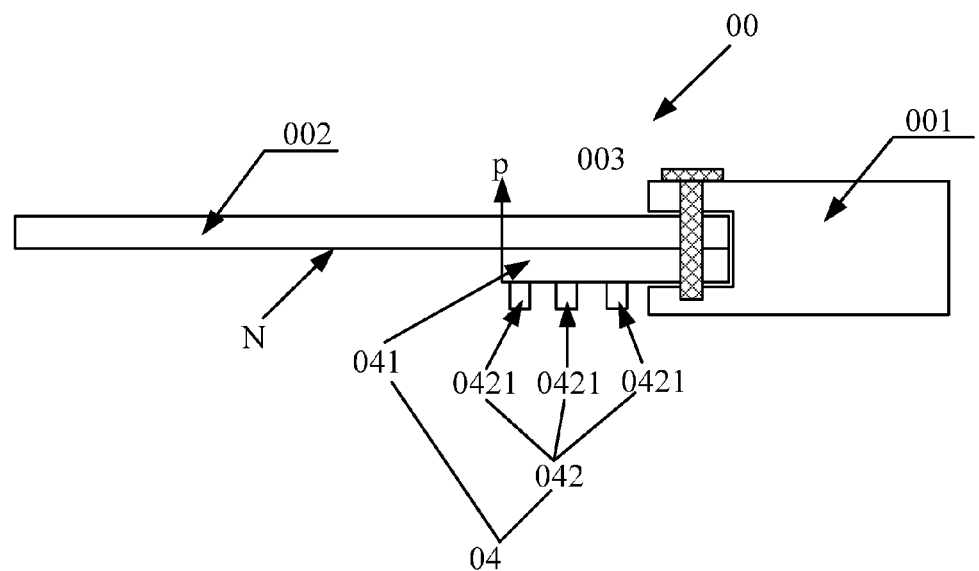
FIG. 19 is a scenario view illustrating that the levelness adjusting device according to the embodiment shown in FIG. 14 is employed to adjust the levelness of the robot's arm.

Further, as shown in FIG. 19, the adjusting unit 042 comprises an adjusting knob 042. The supporting member 041 is provided with an adjusting hole (not shown in FIG. 19) that runs through the arm supporting member 003 in a thickness direction p thereof. The adjusting knob 0421 is disposed on the supporting member 041 through the adjusting hole, and the adjusting knob 0421 contacts with a lower surface N of the arm 002.

The adjusting knob 0421 is threadedly engaged with the adjusting hole. Optionally, the adjusting hole is provided with internal threads, and the adjusting knob 0421 may be a screw that is threadedly engaged with the adjusting hole of the supporting member 041. Alternatively, the adjusting hole is provided with internal threads, and the adjusting knob 0421 may be a nut that is threadedly engaged with the adjusting hole of the supporting member 041.

Figure 20:
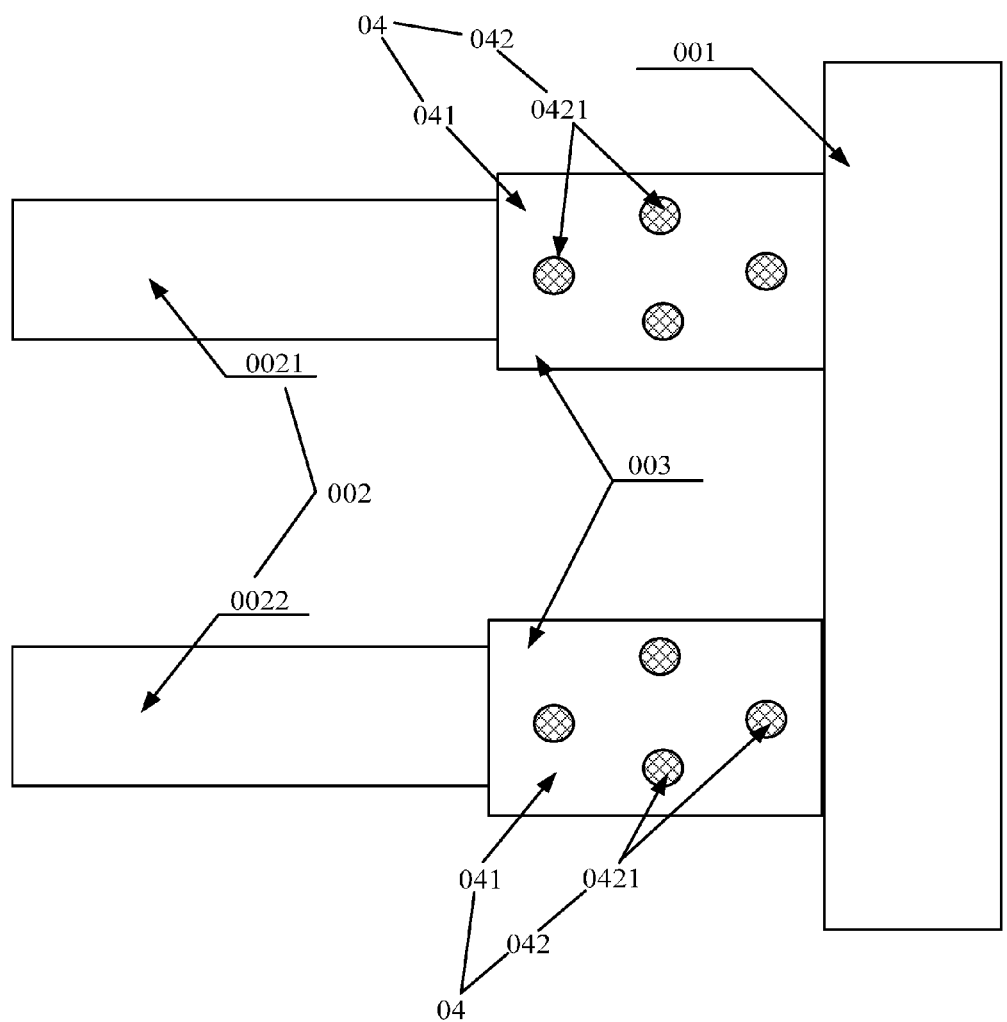
FIG. 20 is a bottom view illustrating that the levelness adjusting device according to the embodiment shown in FIG. 19 is employed to adjust the levelness of the robot's arm.

The number of the adjusting knobs 0421 may be n, where n is a positive integer. The n adjusting knobs 0421 are distributed on the supporting member 041 according to a preset rule. By way of example, reference is made to FIG. 20 which shows a bottom view of the levelness adjusting device 04 according to the embodiment shown in FIG. 19. As shown in FIG. 20, each supporting member 041 is provided with four adjusting knobs 0421 which are arranged on the arm supporting member 003 in a diamond shape.

It is to be noted that the above arrangement is only for purposes of illustration. Indeed, the four adjusting knobs 0421 may be distributed on the supporting member 041 in other manners. For example, the four adjusting knobs 0421 are distributed at four corners of the supporting member 041, respectively, and contact with the arm 002. The number of adjusting knobs 0421 on the supporting member 041 may be of other values. For example, the supporting member 041 is provided with three adjusting knobs 0421 which are distributed on the supporting member 041 in a shape of an equilateral triangle. The embodiments of present disclosure are not so limited.

The levelness detecting device and levelness adjusting device according to embodiments of the present disclosure may be applied to a method as described below.

Figure 21:
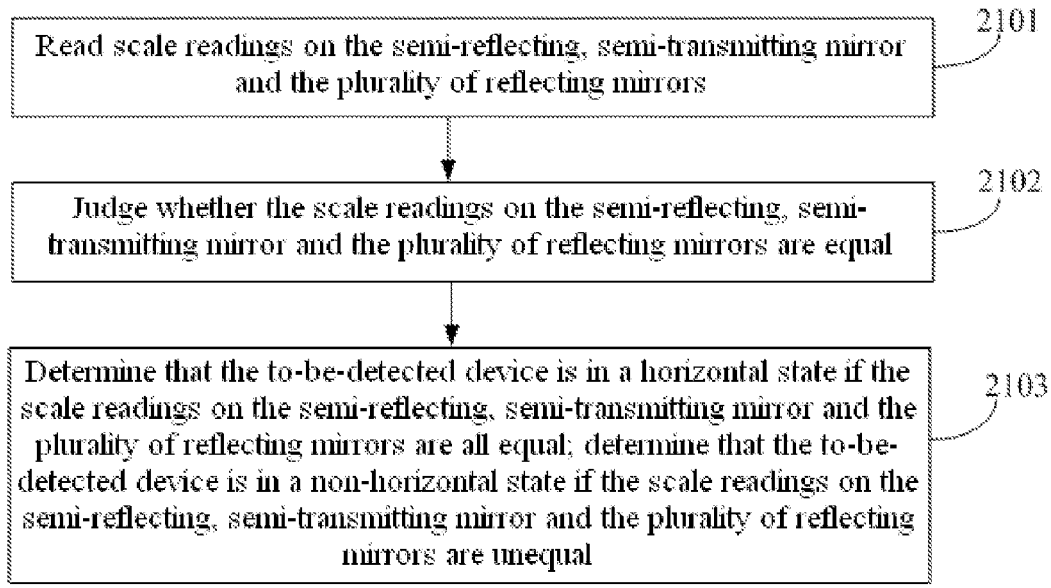
FIG. 21 is a flow chart of a levelness detecting method according to an embodiment of the present disclosure.

Referring to FIG. 21, it shows a flow chart of a levelness detecting method according to an embodiment of the present disclosure. The levelness detecting method may be performed to detect the levelness of a to-be-detected device. The levelness detecting method may be implemented by the levelness detecting device 03 shown in FIG. 3 or FIG. 10. The levelness detecting method comprises the following steps.

At step 2101, scale readings on the semi-reflecting, semi-transmitting mirror and the plurality of reflecting mirrors are read.

The scale reading is a scale on the semi-reflecting, semi-transmitting mirror or the plurality of reflecting mirrors that is indicated by the light. In the embodiment of the present disclosure, the step of reading the scale readings may be implemented by an operator or a machine. As the distance between two adjacent scale lines is 0.1 mm which is easily observed by human eyes, an operator may perform reading of the scale readings.

At step 2102, judgment is made as to whether the scale readings on the semi-reflecting, semi-transmitting mirror and the plurality of reflecting mirrors are equal.

Whether the scale readings on the semi-reflecting, semi-transmitting mirror and the plurality of reflecting mirrors are equal is judged by comparing the scale readings on the semi-reflecting, semi-transmitting mirror and the plurality of reflecting mirrors.

At step 2103, a levelness detection result is obtained. If the scale readings on the semi-reflecting, semi-transmitting mirror and the plurality of reflecting mirrors are all equal, it is determined that the to-be-detected device is in a horizontal state. If the scale readings on the semi-reflecting, semi-transmitting mirror and the plurality of reflecting mirrors are unequal, it is determined that the to-be-detected device is in a non-horizontal state.

Equality of the scale readings on the semi-reflecting, semi-transmitting mirror and the plurality of reflecting mirrors indicates that different parts of the to-be-detected device are at the same height. Furthermore, since the to-be-detected device is generally placed in a horizontal plane under the detection of levelness, it is determined that the to-be-detected device is in the horizontal state.

Figure 22:
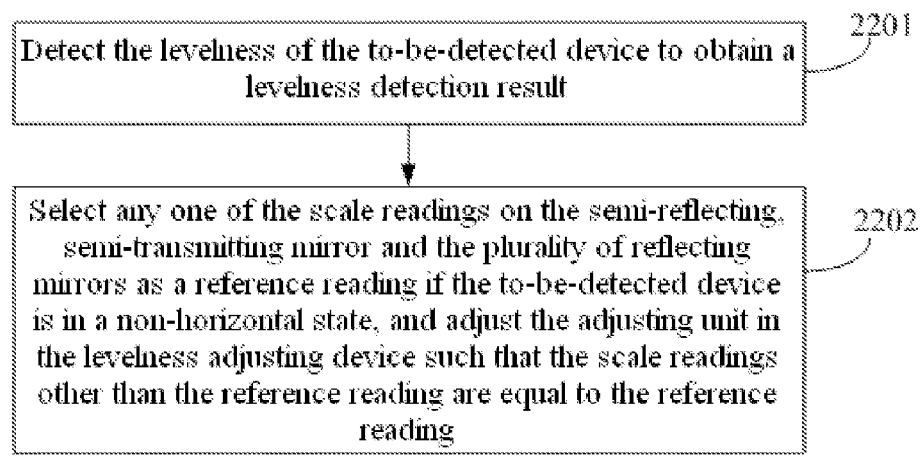
FIG. 22 is a flow chart of a levelness adjusting method according to an embodiment of the present disclosure.

Referring to FIG. 22, it shows a flow chart of a levelness adjusting method according to an embodiment of the present disclosure. The levelness adjusting method may be implemented by the levelness adjusting device 04 as shown in any of FIGS. 12 and 17 to 20. The levelness adjusting method comprises the following steps.

At step 2201, the levelness detecting method according to the embodiment shown in FIG. 21 is employed to detect the levelness of the to-be-detected device to obtain a levelness detection result.

At step 2202, if the to-be-detected device is in a non-horizontal state, any one of the scale readings on the semi-reflecting, semi-transmitting mirror and the plurality of reflecting mirrors is selected as a reference reading, and the adjusting unit in the levelness adjusting device is adjusted such that the scale readings other than the reference reading are equal to the reference reading.

In adjustment of the adjusting unit, the operator may adjust the adjusting unit by observing the scale readings of the semi-reflecting, semi-transmitting mirrors and the plurality of reflecting mirrors until the respective scale readings are equal.

By selecting any one of the scale readings on the semi-reflecting, semi-transmitting mirror and the plurality of reflecting mirrors as a reference reading, the adjusting unit is adjusted such that the scale readings other than the reference reading are equal to the reference reading. The levelness adjusting method according to embodiments of the present disclosure solves problems with the prior art, such as a complicated, time-consuming adjustment procedure, and a low adjustment precision, and accordingly achieves an effect of a simplified, time-saving adjustment procedure and an improved adjustment precision.

Those of ordinary skill in the art may appreciate that all or part of the steps of the above embodiments may be implemented by hardware alone or by hardware that acts under instructions of a program. The program may be stored in a computer-readable storage medium which may be a read-only memory, a magnetic disk, an optical disk or the like. The foregoing is only specific embodiments of the present disclosure and not intended to limit the present disclosure. Any modifications, equivalent substitutions and improvements made within the spirit and principle of the present disclosure are to be encompassed in the protection scope of the present disclosure.

The invention claimed is:

1. A levelness detecting device, comprising:
   a light emitter;
   a semi-reflecting, semi-transmitting mirror; and
   a plurality of reflecting mirrors comprising a first reflecting mirror, a second reflecting mirror, and a third reflecting mirror;
   wherein the semi-reflecting, semi-transmitting mirror and the plurality of reflecting mirrors are arranged on a to-be-detected plane and are each provided with a scale indicative of a height; and
   wherein the light emitter, the semi-reflecting, semi-transmitting mirror and the plurality of reflecting mirrors are arranged such that light emitted from the light emitter is split into two beams of exit light after passing through the semi-reflecting, semi-transmitting mirror, with one beam of exit light reaching the first reflecting mirror, the other reaching the second reflecting mirror and then reflected by the second reflecting mirror to the third reflecting mirror, wherein the levelness of the to-be-detected plane is detected by comparing scale readings of the light on the semi-reflecting, semi-transmitting mirror and the plurality of reflecting mirrors.

2. The levelness detecting device according to claim 1, wherein the light emitter is arranged to emit light in a horizontal direction.

3. The levelness detecting device according to claim 2, wherein the semi-reflecting, semi-transmitting mirror, the first reflecting mirror, the second reflecting mirror and the third reflecting mirror are arranged such that the to-be-detected plane is detected as a horizontal plane if the scale readings on the semi-reflecting, semi-transmitting mirror, the first reflecting mirror, the second reflecting mirror and third reflecting mirror are equal to one another, and otherwise the to-be-detected plane is detected as being in a non-horizontal state.

4. The levelness detecting device according to claim 2, wherein the light emitter is a laser emitter.

5. The levelness detecting device according to claim 1, wherein the semi-reflecting, semi-transmitting mirror is provided with a semi-reflecting, semi-transmitting film on a light entry surface thereof, the semi-reflecting, semi-transmitting film being provided with a scale in a height direction of the semi-reflecting, semi-transmitting mirror, and wherein each of the plurality of reflecting mirrors is provided with a total reflecting film on a light entry surface thereof, the total reflecting film being provided with a scale in a height direction of the reflecting mirror.

6. The levelness detecting device according to claim 5, wherein the light emitter is a laser emitter.

7. The levelness detecting device according to claim 1, wherein a distance between the semi-reflecting, semi-transmitting mirror and the first reflecting mirror is equal to a distance between the second reflecting mirror and the third reflecting mirror, and a distance between the semi-reflecting, semi-transmitting mirror and the second reflecting mirror is equal to a distance between the first reflecting mirror and the third reflecting mirror.

8. The levelness detecting device according to claim 7, wherein the light emitter is a laser emitter.

9. The levelness detecting device according to claim 1, wherein a light entry surface of the semi-reflecting, semi-transmitting mirror and a light entry surface of each of the plurality of reflecting mirrors are both flat surfaces, the light entry surface of the semi-reflecting, semi-transmitting mirror being parallel to the light entry surface of the second reflecting mirror, the light entry surface of the first reflecting mirror being parallel to the light entry surface of the third reflecting mirror.

10. The levelness detecting device according to claim 9, wherein an angle between the light entry surface of the semi-reflecting, semi-transmitting mirror and the light entry surface of the first reflecting mirror is 90 degrees, and an angle between the light entry surface of the second reflecting mirror and the light entry surface of the third reflecting mirror is 90 degrees.

11. The levelness detecting device according to claim 9, wherein the light emitter is a laser emitter.

12. The levelness detecting device according to claim 1, wherein the light emitter is a laser emitter.

13. The levelness detecting device according to claim 1, wherein the scale of each of the semi-reflecting, semi-transmitting mirror and the plurality of reflecting mirrors has a precision of 0.01 mm.

14. A levelness adjusting device for use with the levelness detecting device according to claim 1, comprising:
- a supporting member configured to support a to-be-adjusted device and provided with an adjusting hole; and
- an adjusting unit running through the adjusting hole disposed on the supporting member and contacting with the to-be-adjusted device;

wherein the adjusting unit is configured to move relative to the adjusting hole to adjust the levelness of the to-be-adjusted device.

15. The levelness adjusting device according to claim 14, wherein the adjusting unit is movable in a direction in which it runs through the adjusting hole.

16. The levelness adjusting device according to claim 14, wherein the adjusting unit comprises an adjusting knob threadedly engaged with the adjusting hole.

17. The levelness adjusting device according to claim 16, wherein the adjusting knob is any one of a screw and a nut.

18. The levelness adjusting device according to claim 16, wherein the number of the adjusting knobs is n, wherein n is a positive integer, and wherein the n adjusting knobs are distributed on the supporting member in a preset arrangement.

19. A levelness adjusting method of using the levelness adjusting device according to claim 14 to adjust a levelness of a to-be-detected device, comprising:
- detecting the levelness of the to-be-detected device using the levelness detecting method according to claim 15;
- selecting any one of the scale readings on the semi-reflecting, semi-transmitting mirror and the plurality of reflecting mirrors as a reference reading if the to-be-detected device is in a non-horizontal state; and
- adjusting the adjusting unit in the levelness adjusting device such that the scale readings other than the reference reading are equal to the reference reading.

20. A levelness detecting method of using the levelness detecting device according to claim 1 to detect a levelness of a to-be-detected device, comprising:
- reading scale readings on the semi-reflecting, semi-transmitting mirror and the plurality of reflecting mirrors;
- judging whether the scale readings on the semi-reflecting, semi-transmitting mirror and the plurality of reflecting mirrors are equal; and
- determining that the to-be-detected device is in a horizontal state if the scale readings on the semi-reflecting, semi-transmitting mirror and the plurality of reflecting mirrors are all equal; and
- determining that the to-be-detected device is in a non-horizontal state if the scale readings on the semi-reflecting, semi-transmitting mirror and the plurality of reflecting mirrors are unequal.

\* \* \* \* \*